(12) United States Patent
Roesner et al.

(10) Patent No.: US 10,648,434 B2
(45) Date of Patent: May 12, 2020

(54) INTAKE DEVICE WITH FORMALLY INTEGRATED AIR GUIDE INTAKE DUCT

(71) Applicant: Bayerische Motoren Werke Aktiengesellschaft, Munich (DE)

(72) Inventors: Mathias Roesner, Munich (DE); Peter Olbrzymek, Schwabhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 62 days.

(21) Appl. No.: 15/251,102

(22) Filed: Aug. 30, 2016

(65) Prior Publication Data

US 2016/0369754 A1    Dec. 22, 2016

Related U.S. Application Data

(63) Continuation of application No. PCT/EP2015/053816, filed on Feb. 24, 2015.

(30) Foreign Application Priority Data

Apr. 15, 2014    (DE) ........................ 10 2014 207 167

(51) Int. Cl.
*F02M 35/16* (2006.01)
*B62M 7/02* (2006.01)
(Continued)

(52) U.S. Cl.
CPC ............ *F02M 35/162* (2013.01); *B62M 7/02* (2013.01); *F02M 35/024* (2013.01); *F02M 35/0216* (2013.01); *F02M 35/0226* (2013.01); *F02M 35/044* (2013.01); *F02M 35/10242* (2013.01); *B62K 2202/00* (2013.01)

(58) Field of Classification Search
CPC ... B62M 7/02; F02M 35/162; F02M 35/0216; F02M 35/0226; F02M 35/024; F02M 35/044; F02M 35/10242
USPC ........ 180/68.1–4, 181, 55, 60, 63, 220, 229; 165/41; 280/169, 163, 164.1
See application file for complete search history.

(56) References Cited

U.S. PATENT DOCUMENTS 1,007,702 A * 11/1911 Huber .................... F25D 17/08
165/135
3,955,642 A * 5/1976 Shino ....................... A47L 5/36
180/164
(Continued)

FOREIGN PATENT DOCUMENTS

CN        1199817 A      11/1998
CN        1523219 A      8/2004
(Continued)

OTHER PUBLICATIONS

International Search Report (PCT/ISA/210) issued in PCT Application No. PCT/EP2015/053816 dated Jun. 6, 2015 with English-language translation (four (4) pages).
(Continued)

*Primary Examiner* — Jacob D Knutson
(74) *Attorney, Agent, or Firm* — Crowell & Moring LLP

(57) ABSTRACT

An intake device is provided for the combustion air of a motorcycle, including an air filter box and an air guide intake duct which extends from the air filter box in a defined orientation to an intake chamber and at least sections of which are formed by parts of the air filter box.

15 Claims, 2 Drawing Sheets

(51) Int. Cl.
*F02M 35/02* (2006.01)
*F02M 35/022* (2006.01)
*F02M 35/024* (2006.01)
*F02M 35/04* (2006.01)
*F02M 35/10* (2006.01)

(56) References Cited

U.S. PATENT DOCUMENTS

| | | | |
|---|---|---|---|
| 4,733,639 A * | 3/1988 | Kohyama | B62M 7/12 |
| | | | 123/198 E |
| 7,159,678 B2 * | 1/2007 | Michisaka | F02M 35/162 |
| | | | 180/68.3 |
| 7,431,114 B2 * | 10/2008 | Ohira | B62K 19/46 |
| | | | 180/219 |
| 9,217,400 B2 * | 12/2015 | Koike | F02M 35/0204 |
| 2001/0011530 A1 * | 8/2001 | Saito | F02B 63/04 |
| | | | 123/2 |
| 2005/0145427 A1 | 7/2005 | Sugitani et al. | |

FOREIGN PATENT DOCUMENTS

| | | |
|---|---|---|
| CN | 102597482 A | 7/2012 |
| CN | 102822045 A | 12/2012 |
| CN | 103184957 A | 7/2013 |
| EP | 1 526 273 B1 | 9/2010 |
| EP | 2 527 179 A1 | 11/2012 |
| JP | 03178698 A * | 8/1991 |
| JP | 7-329871 A | 12/1995 |
| JP | 8-318887 A | 12/1996 |
| JP | 10-299471 A | 11/1998 |
| JP | 10-317976 A | 12/1998 |
| JP | 2000-345931 A | 12/2000 |
| JP | 2000-352312 A | 12/2000 |
| JP | 2001-63665 A | 3/2001 |
| JP | 2002-213311 A | 7/2002 |
| JP | 2007-154801 A | 6/2007 |
| JP | 2007-168530 A | 7/2007 |
| JP | 2008-24101 A | 2/2008 |

OTHER PUBLICATIONS

German-language Written Opinion (PCT/ISA/237) issued in PCT Application No. PCT/EP2015/053816 dated Jun. 8, 2015 (five (5) pages).

German Search Report issued in counterpart German Application No. 10 2014 207 167.4 dated Nov. 26, 2014 with partial English-language translation (thirteen (13) pages).

Chinese Office Action issued in Chinese counterpart application No. 201580003057.X dated Jan. 10, 2018, with partial English translation (Eleven (11) pages).

Indian Examination Report issued in Indian counterpart application No. 201647038584 dated Apr. 22, 2019 (Six (6) pages).

* cited by examiner

INTAKE DEVICE WITH FORMALLY INTEGRATED AIR GUIDE INTAKE DUCT

CROSS REFERENCE TO RELATED APPLICATIONS

This application is a continuation of PCT International Application No. PCT/EP2015/053816, filed Feb. 24, 2015, which claims priority under 35 U.S.C. § 119 from German Patent Application No. 10 2014 207 167.4, filed Apr. 15, 2014, the entire disclosures of which are herein expressly incorporated by reference.

BACKGROUND AND SUMMARY OF THE INVENTION

The invention relates to an intake device for combustion air with a formally integrated air guide intake duct in a motorcycle, in particular in a motor scooter with a drive assembly swing arm.

In conventional motorcycles, in particular in motor scooters with drive assembly swing arms, the intake air is sucked in through a snorkel which is attached to the air filter box as an additional component. Depending on the vehicle, the snorkel is placed in a concealed manner behind trim parts of the vehicle, the exact arrangement being dependent on the conditions in the respective vehicle. Since a drive assembly swing arm can be used in vehicles of various designs, different overall shapes of the vehicles depending on the model are the rule. The structurally fixed intake snorkel can be adapted only poorly, however, to the formally different boundary conditions of each model. Furthermore, the position of the intake opening of the snorkel is in each case undefined here and is not clearly reproducible. The air which is actually sucked in and its quality (temperature, humidity) is influenced by the position of the intake opening, however. Furthermore, the snorkel requires installation space which is to be provided in advance in the construction and into which the snorkel then has to be introduced during assembly in a complicated manner depending on the vehicle. A snorkel of this type cannot be integrated in an ideal manner into the overall vehicle.

The invention is therefore based on the object of providing an intake device which can dispense with the use of an external intake snorkel.

This and other objects are achieved by an intake device for combustion air in a motorcycle, with an air filter box and an air guide intake duct which extends from the air filter box in a fixed orientation to an intake space and is formed at least in sections by parts of the air filter box.

The air guide intake duct which is preferably configured in one piece on the air filter box replaces the snorkel and is integrated formally into the overall vehicle or the drive assembly swing arm of a motor scooter.

In one embodiment of the motorcycle with a drive assembly swing arm, it is provided as a formally integrative solution of the invention that a side trim part is used and the air guide intake duct is formed from parts of the side trim part and the air filter box. Each part per se provides a part of the air guide intake duct, which parts form the air guide intake duct and possibly parts of the air filter box in the assembled or mounted state. The edges to be assembled can be sealed via suitable sealing measures, with the result that no leakage air is sucked in.

In one preferred embodiment of the invention, in the installed state, the air guide intake duct is oriented toward the ground in a range from −45 degrees to +45 degrees, more preferably in a range from −15 degrees to +15 degrees, with respect to a vertical line. An extent of the air guide intake duct of this type which is oriented toward the ground makes a gravity-induced return (water separation) possible of water which is sucked in with the combustion air, for example in the case of rain or high air humidity which can condense in the air guide intake duct.

It is provided in one advantageous embodiment, furthermore, that, in the interior, the air guide intake duct has a labyrinth which connects and returns moisture which is sucked in together with the combustion air before reaching the air filter box. It is proposed as one implementation of a labyrinth of this type to configure fan elements in the air guide intake duct, on which fan elements moisture collects and drips off again owing to gravity. For this purpose, additional lines or guide ducts can be provided in the air guide intake duct, via which lines or guide ducts the water which is collected by the fan elements drains off.

It is particularly favorable to configure the fan elements in one piece on the air guide intake duct, with the result that they do not become detached or change the flow over the service life.

It is also provided according to the invention in one exemplary embodiment that the air guide intake duct extends into the air filter box over a predefined length. That section of the air guide intake duct which protrudes into the air filter box can be adhesively bonded or can be fastened in a sealed manner by way of other means which are known in the art. The formal integration into the air filter box affords the advantage that the air guide intake duct can be dimensioned with regard to its length in an optimum manner in flow terms independently of the remaining components of the vehicle.

A motor scooter with a drive assembly swing arm and an intake cavity which is integrated formally therein is likewise a constituent part of the invention, an intake device according to the above description being arranged on the drive assembly swing arm. In one favorable embodiment, the intake space is an intake cavity which is configured in the drive assembly swing arm and to which the air guide intake duct extends, starting from the air filter box. A completely linked system is produced in this way which is formally integrated completely into the drive assembly swing arm or the overall vehicle, without adaptations depending on the model being necessary.

All the above-described features can be combined as desired, insofar as this is technically possible.

Other objects, advantages and novel features of the present invention will become apparent from the following detailed description of one or more preferred embodiments when considered in conjunction with the accompanying drawings.

BRIEF DESCRIPTION OF THE DRAWINGS

Identical designations denote identical parts in all the figures.

DETAILED DESCRIPTION OF THE DRAWINGS

Figure 1:
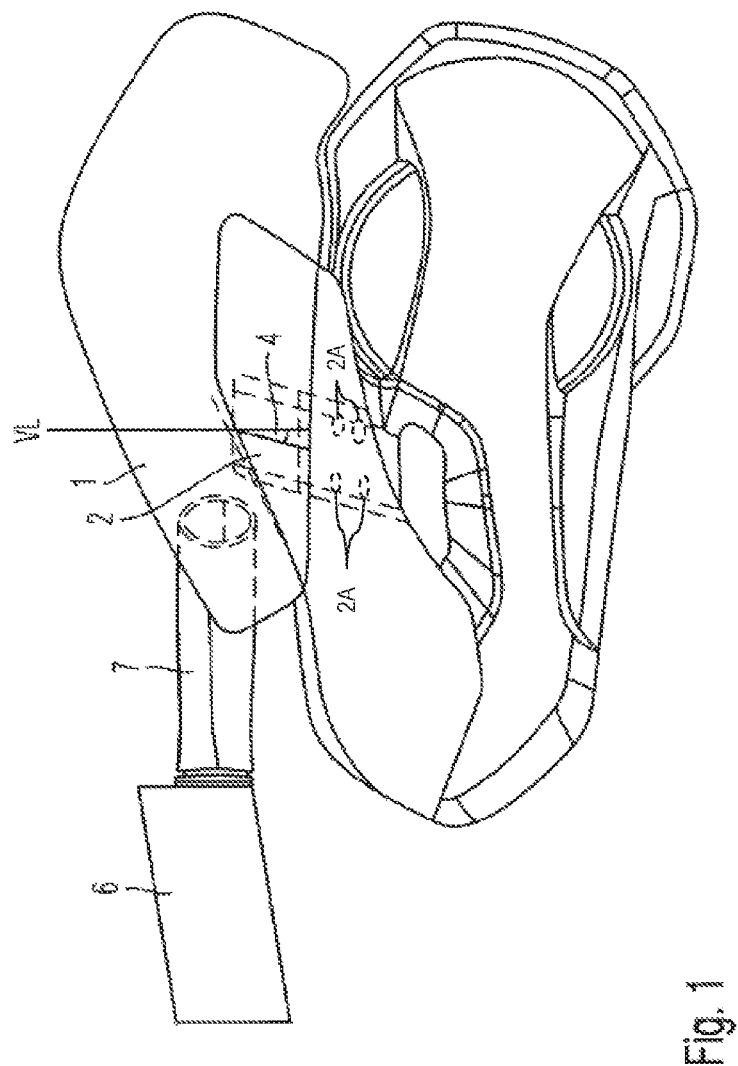
FIG. 1 is a side view of an intake device according to the invention in a first embodiment.

FIG. 1 shows a side view of an intake device which is integrated into a vehicle. The intake device has an air filter box 1 and an air guide intake duct 2 which extends from the air filter box 1 in an orientation at an angle 4 of +15 degrees with respect to a vertical line VL to an intake space in the vehicle interior and is formed in sections by parts of the air filter box 1. The air guide intake duct 2 is not only formed partially by the air filter box 1, but rather also extends into it. In the embodiment which is shown, the air filter box 1 and the air guide intake duct 2 are configured in one piece. The combustion air which is sucked in by the engine 6 leaves the air filter box 1 via a connecting line 7 to the engine 6.

Figure 2:
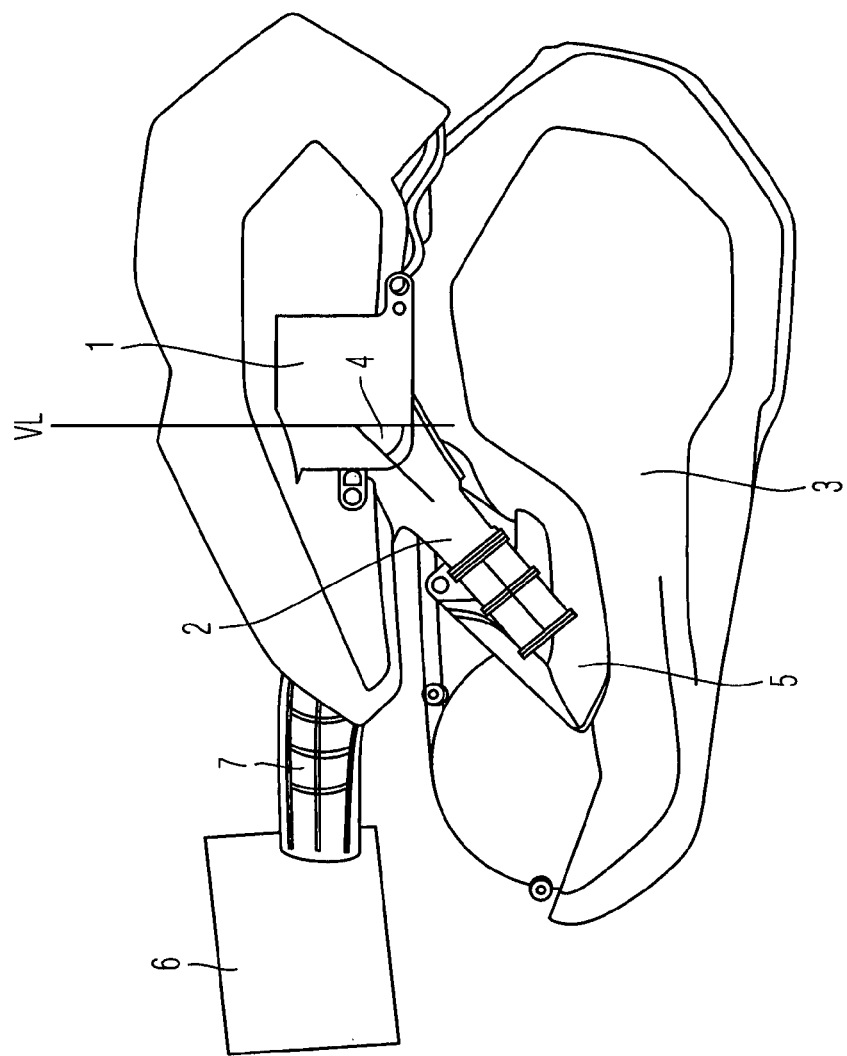
FIG. 2 is a side view of an intake device according to the invention in a second embodiment.

FIG. 2 shows a side view of a further intake device according to the invention in a second exemplary embodiment. The air guide intake duct 2 extends from the air filter box 1 in an orientation at an angle 4 of +45 degrees with respect to a vertical line VL to an intake cavity 5 which is formed in the drive assembly swing arm 3.

Fan elements 2A shown in FIG. 1 are provided in both embodiments in the interior of the air guide intake duct 2, which fan elements form a labyrinth for water separation from the combustion air which is sucked in.

The implementation of the invention is not restricted to the preferred exemplary embodiments which are specified above. Rather, a number of variants are conceivable which make use of the described solution even in the case of embodiments of fundamentally different type. For example, the air filter box and the air guide intake duct are preferably formed from the same material.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An intake device for combustion air in a motorcycle, comprising:
   an air filter box; and
   an air guide intake duct,
   wherein:
   the motorcycle has a drive assembly swing arm with at least one side trim part and wherein the drive assembly swing arm defines an intake cavity, and
   the air guide intake duct is formed in a formally integrated manner from parts of the side trim part and the air filter box, wherein the air guide intake duct and the air filter box are configured in one piece, and wherein the air guide intake duct extends from the air filter box in a fixed orientation to the intake cavity of the drive assembly swing arm.

2. The intake device according to claim 1, wherein, in an installed state, the air guide intake duct is oriented toward the ground in a range from −45 degrees to +45 degrees with respect to a vertical line.

3. The intake device according to claim 2, wherein the air guide intake duct extends into the air filter box over a predefined length.

4. The intake device according to claim 1, wherein, in an installed state, the air guide intake duct is oriented toward the ground in a range from −15 degrees to +15 degrees with respect to a vertical line.

5. The intake device according to claim 4, wherein the air guide intake duct extends into the air filter box over a predefined length.

6. The intake device according to claim 1, wherein, in an interior, the air guide intake duct has fan elements which collect and return moisture which is sucked in before reaching the air filter box.

7. The intake device according to claim 1, wherein the air guide intake duct extends into the air filter box over a predefined length.

8. An intake device for combustion air in a motorcycle, comprising:
   an air filter box; and
   an air guide intake duct which extends from the air filter box in a fixed orientation to an intake space, the air guide intake duct being formed at least in sections by parts of the air filter box,
   wherein, in an interior, the air guide intake duct has fan elements which collect and return moisture which is sucked in before reaching the air filter box.

9. The intake device according to claim 8, wherein the fan elements are configured in one piece on the air guide intake duct.

10. A motor scooter, comprising:
    a drive assembly swing arm having an integrated intake cavity; and
    an intake device for combustion air in the motor scooter, the intake device being arranged on the drive assembly swing arm and comprising:
    an air filter box, and
    an air guide intake duct which extends from the air filter box in a fixed orientation to the intake cavity of the drive assembly swing arm, the air guide intake duct being formed in a formally integrated manner from parts of a side trim part of the drive assembly swing arm and parts of the air filter box, wherein the air guide intake duct and the air filter box are configured in one piece.

11. The motor scooter according to claim 10, wherein the air guide intake duct is oriented toward the ground in a range from −45 degrees to +45 degrees with respect to a vertical line.

12. The motor scooter according to claim 10, wherein the air guide intake duct is oriented toward the ground in a range from −15 degrees to +15 with respect to a vertical line.

13. The motor scooter according to claim 10, wherein the air guide intake duct comprises fan elements in an interior thereof which collect and return moisture that is sucked in before reaching the air filter box.

14. The motor scooter according to claim 13, wherein the fan elements are configured in one piece on the air guide intake duct.

15. The motor scooter according to claim 10, wherein the air guide intake duct extends into the air filter box over a predefined length.

* * * * *